(12) United States Patent
Stadtfeld (10) Patent No.: US 8,573,087 B2
(45) Date of Patent: Nov. 5, 2013

(54) HYPOID GEARS WITH LOW SHAFT ANGLES

(75) Inventor: Hermann J. Stadtfeld, Webster, NY (US)

(73) Assignee: The Gleason Works, Rochester, NY (US)

(*) Notice: Subject to any disclaimer, the term of this patent is extended or adjusted under 35 U.S.C. 154(b) by 320 days.

(21) Appl. No.: 13/127,650

(22) PCT Filed: Nov. 24, 2009

(86) PCT No.: PCT/US2009/065639
§ 371 (c)(1),
(2), (4) Date: May 4, 2011

(87) PCT Pub. No.: WO2010/068412
PCT Pub. Date: Jun. 17, 2010

(65) Prior Publication Data
US 2011/0209573 A1    Sep. 1, 2011

(51) Int. Cl.
*F16H 1/12* (2006.01)
(52) U.S. Cl.
USPC .............. 74/416; 74/417; 74/423; 74/457; 74/459.5
(58) Field of Classification Search
USPC ............ 74/412 R, 416, 417, 423, 457, 458, 74/459.5
See application file for complete search history.

(56) References Cited

U.S. PATENT DOCUMENTS

| | | | |
|---|---|---|---|
| 2,002,310 A | 5/1935 | Christman | |
| 2,750,806 A | 6/1956 | Hobbs | |
| 3,605,188 A * | 9/1971 | McCormick et al. | 25/205 |
| 4,307,797 A * | 12/1981 | Belansky | 192/108 |
| 4,761,114 A * | 8/1988 | Barland | 414/735 |
| 4,773,763 A | 9/1988 | Weber | |
| 4,981,402 A | 1/1991 | Krenzer et al. | |
| 5,182,960 A * | 2/1993 | Chary | 74/417 |
| 5,203,750 A * | 4/1993 | Oster et al. | 475/230 |
| 5,232,280 A * | 8/1993 | Moriyama | 366/83 |
| 5,580,298 A | 12/1996 | Stadtfeld | |
| 6,669,415 B2 | 12/2003 | Stadtfeld et al. | |
| 6,712,566 B2 | 3/2004 | Stadtfeld et al. | |
| 7,426,777 B2 * | 9/2008 | Nagata et al. | 29/33 R |
| 7,462,092 B2 * | 12/2008 | Stadtfeld et al. | 451/11 |
| 7,707,721 B2 * | 5/2010 | Leibold | 29/893.1 |
| 7,974,730 B2 * | 7/2011 | Durr | 700/164 |
| 8,047,092 B2 * | 11/2011 | Suzuki et al. | 74/459.5 |

FOREIGN PATENT DOCUMENTS

| | | |
|---|---|---|
| DE | 3700771 C1 | 5/1988 |
| EP | 1260736 A1 | 11/2002 |

OTHER PUBLICATIONS

International Search Report and Written Opinion for PCT/US2009/065639.

* cited by examiner

*Primary Examiner* — David M Fenstermacher
(74) *Attorney, Agent, or Firm* — Robert L. McDowell (57) ABSTRACT

A gear pair set comprising low shaft angle and offset bevel gears and a method for their manufacture including determination of the appropriate gear and pinion blanks and the basic machine settings for their manufacture. The pair of bevel gears comprises a first member and a second member wherein the members of the pair have a shaft angle in the range of greater than 0° to 30°, preferably greater than 0° to 20°, and have an offset in the range of greater than zero to the sum of half the mean pitch diameters of the two members of the bevel gear pair.

7 Claims, 7 Drawing Sheets

Spiral Formate With Pinion Diameter Increase

Figure 3

Gear Pitch Cone Modification for Hypoid

HYPOID GEARS WITH LOW SHAFT ANGLES

FIELD OF THE INVENTION

The present invention is directed to bevel gears and in particular to low shaft angle offset bevel gears.

BACKGROUND OF THE INVENTION

If two shafts are neither parallel nor perpendicular, but include a small angle in the plane that is defined by the axis of rotation, then two possible gearing solutions are known to accomplish a motion transmission.

One possible solution is called Beveloids. Beveloids are manufactured like cylindrical gears using, for example, a hobbing process for soft manufacturing and a threaded wheel grinding for hard finishing. Shaft angles between 0° and about 15° can be realized according to the Beveloid method which results, depending on the ratio, in gear pitch angles between 0° and about 7.5°, or in case of the combination of one conical gear with one conventional cylindrical gear, the maximal required pitch angle might be as high as about 15°.

The second possibility is the application of angular spiral bevel gears. The ratio in most real applications is close to miter which results in pitch angles between 0° and about 7.5°.

The described angular spiral bevel gearsets are used primarily in automotive transfer cases to transmit rotation and torque from the output shaft of a transmission to the front axle of an all wheel driven vehicle.

The mechanical function of both, tapered cylindrical gears (Beveloids) or angular spiral bevel gears is to provide an angle between the shafts in the plane that their two axes define. In most cases concerning all wheel drive vehicles, this will still require two constant velocity joints or two universal joints (one on each end of the drive shaft) in order to connect the output shaft of the gear box with the input shaft of the front axle which commonly have different vertical locations.

In order to connect two points in space, like in case of a propeller shaft between the output of a transfer case and a front axle input, it is necessary to provide one angle and a linear offset or two angles in perpendicular planes. Hypoid bevel gears represent such a general valid solution of input/output shaft orientation in three dimensional space. However, the features of hypoid gears known to date do not cover the case of low shaft angle and high offset. The different hypoid theories applied at present do not allow for the design of low shaft angle bevel gears with any offset. The hypoid theory is based on a flat or conical generating gear as the basis for basic setting and tool parameter calculation. Shaft angles close to and including 90° combined with ratios of 2.5 and higher lead to gear pitch cone angles of about 68° and higher and pinion pitch cone angle of about 22° and lower. This leads to a typical ring gear whose cone is close to a plane, with a tangent plane to the pitch cone which is close enough to the pitch cone in the neighborhood of the contacting line. Such an arrangement allows for the application of certain amounts of hypoid offset, derived in the pitch cone tangent plane according to the traditional hypoid theory.

However, traditional theory fails in cases of high hypoid offsets (close or equal to half the ring gear diameter). The traditional hypoid theory also fails in cases of low ratio (close to 1.0). In cases of high offset, worm gear drives can be used to realize a 90° shaft angle and an offset of half the gear diameter plus half the worm diameter (like center distance in cylindrical gearing). In case of low ratios, crossed helical gears can be used to achieve any desired shaft angle combined with an offset equal the center distance of those crossed helical gears.

The freedom of any small shaft angle (e.g. greater than 0° to 30°) combined with any offset from zero to the sum of half the mean pitch diameters of the two members will be possible with the teachings of the inventive method.

SUMMARY OF THE INVENTION

The present invention is directed to a gear set comprising low shaft angle and offset bevel gears and a method for their manufacture including determination of the appropriate gear and pinion blanks and the basic machine settings for their manufacture.

DETAILED DESCRIPTION OF THE PREFERRED EMBODIMENT

The present invention will now be discussed with reference to the accompanying drawings which are intended to represent the present invention by way of example only. In the context of the present application, the terms "pinion" and "gear" are utilized to represent mating members of a gear set or pair. It is further noted that the recitation of directions such as "horizontal", "vertical", "downward", "right" and "left" are for reference purposes only and are done so with respect to the plane of the page on which the Figures are presented.

In the production of gears, especially bevel gears, including hypoid gears, two types of processes are commonly employed, generating processes and non-generating processes.

Generating processes can be divided into two categories, face milling (intermittent indexing) and face hobbing (continuous indexing). In generating face milling processes, a rotating tool is fed into the workpiece to a predetermined depth. Once this depth is reached, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll. In generating face hobbing processes, the tool and workpiece rotate in a timed relationship and the tool is fed to depth thereby forming all tooth slots in a single plunge of the tool. After full depth is reached, the generating roll is commenced.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear in the form of a theoretical "crown gear" is applicable in non-generating processes. The crown gear is that theoretical gear whose tooth surfaces are complementary with the tooth surfaces of the workpiece in non-generating processes. Therefore, the cutting blades on the tool represent the teeth of the theoretical crown gear when forming the tooth surfaces on the non-generated workpiece.

The relationship between the workpiece and theoretical generating gear can be defined by a group of parameters known as "basic machine settings". These basic settings communicate a sense of size and proportion regarding the generating gear and the work piece and provide a common starting point for gear design thus unifying design procedures among many models of machines. The basic settings totally describe the relative positioning between the tool and work piece at any instant. Basic machine settings for forming gears are known in the art and disclosures thereof can be found, for example, in U.S. Pat. Nos. 4,981,402; 5,580,298; 6,669,415 and 6,712,566 the disclosures of which are hereby incorporated by reference.

Conventional mechanical gear generating machines for producing bevel and hypoid gears comprise a work support mechanism and a cradle mechanism which, during generating processes, carries a circular tool along a circular path about an axis known as the cradle axis. The cradle represents the body of the theoretical generating gear and the cradle axis corresponds to the axis of the theoretical generating gear. The tool represents one or more teeth on the generating gear. The conventional mechanical machine meets the concept of the theoretical basic machine since nearly all machine settings correspond to theoretical basic settings. Such a machine is shown, for example, in the U.S. patents mentioned above.

Gear producing machines have now been developed which reduce the number of machine settings necessary to orient a tool relative to a work piece. These machines transform the settings and movements of the conventional mechanical machine to a system of linear, rotational and pivoting axes which result in a more universal yet simplified machine. Examples of such universal machines and axes transformations can be found in the previously referenced U.S. Pat. Nos. 4,981,402; 6,669,415 and 6,712,566.

The generating principle is applied between the pinion (usually the driving member) and the gear (usually the driven member). Although in most cases, pinion and gear might have the same, or nearly the same, number of teeth, the gear is preferably used as a generating gear. The inventive method preferably uses a non-generated gear member with straight or curved tooth profile as the generating gear. In conventional bevel and hypoid gears, the non-generated principle is generally only used in cases where the gear pitch cone angle is about 68° and higher. However, in a first step, the inventive method derives bevel gear machine basic settings for a non-generated gear member. Those settings are used to derive, in a second step, the basic settings for a bevel gear generator in order to manufacture the pinion. The cutter head for the pinion cutting (positioned by the basic settings and rotated around the cradle axis) represents one tooth of the non-generated gear member on which the pinion rolls during the generating roll process.

The principle of applying a non-generated gear member in order to generate the mating pinion is the only technique that delivers a precise conjugate relationship between pinion and gear even if the axis of the two members are not in one plane. A conjugate basic geometry also requires the pitch cone to be parallel to the root cone. It has been observed that in case of low shaft angle spiral bevel gear sets, the tooth depth was calculated taller at the toe (reverse tooth taper) in order to fulfill the requirements of completing (matching tooth thickness and opposite member slot width). One element of the inventive method is a parallel depth tooth design which will lead to more optimal tooth proportions than a reverse taper and also fulfill the requirement of parallelism between pitch line and root line. If the axes of the two members are in two parallel planes, the distance between the planes is defined as an offset. In case of conical pitch elements of the two members, this offset is commonly referred to as hypoid offset.

The inventive method defines one member as a pinion (which is preferably the generated member) and one member as gear (which is preferably the non-generated member). In spite of the traditional definitions, gear and pinion in the inventive method can have the same or a similar number of teeth, it is even possible that the pinion has a higher number of teeth than the gear. The inventive method produces a pair of bevel gears comprising a first member and a second member wherein the members of the pair have a shaft angle in the range of greater than 0° to 30°, preferably greater than 0° to 20°, and have a hypoid offset in the range of zero to the sum of half the mean pitch diameters of the two members of the bevel gear pair, preferably greater than zero to the sum of half the mean pitch diameters of the two members of the bevel gear pair (usually expressed in mm or inches).

The conjugacy between the two members is only the basis for the generating principle. In order to make the gearset insensitive to tolerances in manufacturing and assembly, a located contact is achieved using flank surface crowning in the direction of the tooth profile, the tooth length and the path of contact.

If the non-generating process of the gear member is performed with straight cutting blades, then the generation of a pinion tooth will cause additional profile curvature versus an involute (or more precisely defined as spherical involute or octoide). The additional pinion profile curvature can cause undercut in the pinion root area and a pointed topland. To reduce the additional profile curvature in the generated pinion, it is possible to manufacture the non-generated gear teeth with curved blades. If the gear cutter blades are formed like the involute of a similar generated gear, then the pinion tooth profiles will be regular involutes without additional profile curvature and without additional undercut in the root area and with no pointed topland versus a standard profile. It is also possible to approximate the involute function of the gear blade profile with circular or parabolic shape functions. This will achieve a similar effect and reduce the complexity of blade grinding or grinding wheel dressing kinematics.

Figure 1:
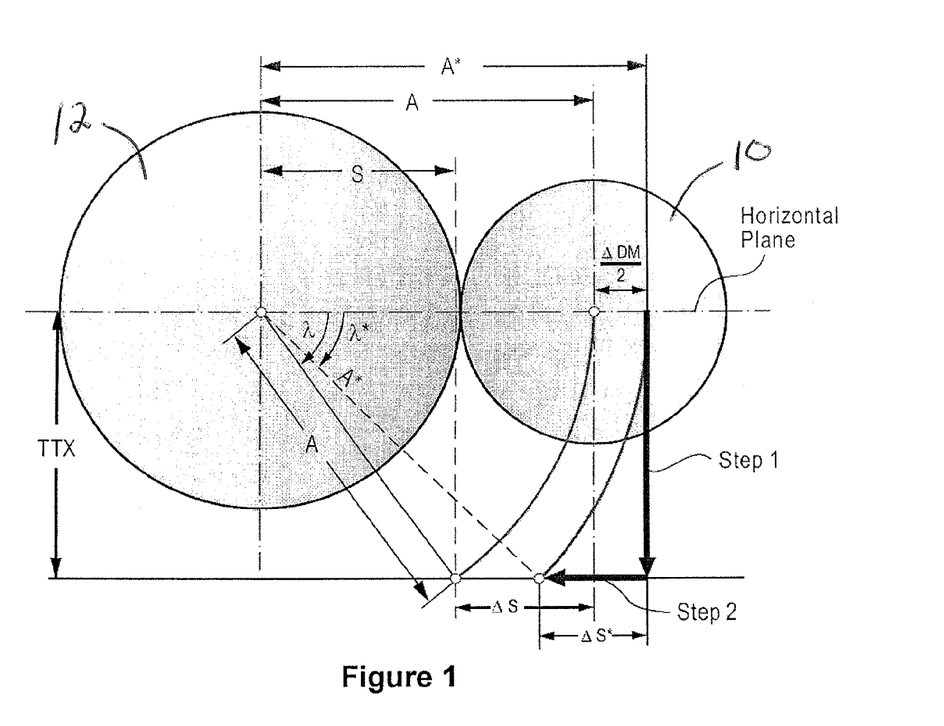
FIG. 1 illustrates a spiral bevel gearset comprising a pinion member and a gear member with inventive steps 1 and 2.

The adjustment of the offset is done in two steps, starting from the spiral bevel non-generated gear design. In FIG. 1, a spiral bevel gearset comprising a pinion member 10 and a gear member 12 is illustrated with the axes of the gear set members shown lying in a horizontal plane. The first step to offset the pinion 10 relative to the gear 12 is to move the pinion axis in a vertical direction (Step 1). A positive offset for pinions with left hand spiral direction means a downward movement of the pinion, if the view is directed onto the front of the pinion and if the pinion is located to the right (gear to the left) as shown in FIG. 1. The rule for positive offset is identical to hypoid gear sets. The amount of the downward movement is identical to the amount of offset. However, this vertical movement will increase the center distance (e.g. at the center of the face width) as well as the diameter of the pinion (of the same amount as the center distance increases). In contrast to regular hypoid pinions, where the diameter is also increased (in case of a positive offset), the diameter increase of the pinions of the present invention would be larger than required to compensate for the increasing pinion spiral angle. This is the reason for the inventive correction of the pinion diameter, accomplished by a second movement of the pinion axis in a horizontal plane towards the gear (Step 2). The amount of this movement is determined such that the original center distance is re-established. A pinion diameter increase, because of the spiral angle increase due to the offset is not required (would lead to a small addendum modification) but can be introduced in order to achieve a minimal impact of the hypoid offset onto the pinion profile.

In order to optimize the generated pinion tooth profiles along the face width, a pinion diameter increase or reduction is proposed (leads to a profile shift or addendum modification). The procedure used for this pinion diameter increase has to assure that the offset remains constant. This is achieved if center distance and offset angle are calculated as follows:

$$A = (DOMR2*Z2 + DOMR2*Z1)/2 \tag{1}$$

$$\lambda = a\sin(TTX/A) \tag{2}$$

$$A^* = A + \Delta Dm/2 = (DOMR2*Z2 + DOMR2*Z1 + \Delta DM)/2 \tag{3}$$

$$\lambda^* = a\sin(TTX/A^*) \tag{4}$$

where: A=center distance, calculated at center face width of conical gears
   λ=offset angle
   λ*=offset angle in case of pinion diameter increase
   TTX=hypoid offset
   A*=center distance in case of pinion diameter increase
   ΔDM=pinion diameter increase
   DOMR2=face module of gear
   Z1=number of pinion teeth
   Z2=number of gear teeth The horizontal movement in order to re-establish the pinion diameter is calculated:

$$\Delta s = A*(1-\cos\lambda) \tag{5}$$

or in case of a pinion diameter increase:

$$\Delta s^* = A^{**}(1-\cos\lambda^*) \tag{6}$$

where: Δs=horizontal movement of pinion axis towards gear axis
   Δs*=horizontal movement of pinion axis in case of a pinion diameter increase Initially the pitch cone angles are calculated for spiral bevel gears using the following equation, solved with an iteration process:

$$\sin\gamma_{gear\text{-}spiral}/\sin\gamma_{pinion\text{-}spiral} = Z2/Z1 \tag{7}$$

where: $\gamma_{pinion\text{-}spiral}$=pitch angle of spiral bevel pinion before introduction of offset
   $\gamma_{gear\text{-}spiral}$=pitch angle of spiral bevel gear before introduction of offset The inventor has discovered that the offset will change the cone angle of the pinion significantly rather than the spiral angle (as commonly expected in hypoid gears). In order to keep the cone angles of pinion and gear similar (to the spiral bevel gear design) and avoid exotic pinion tooth profiles, namely in the root fillet or undercut area, it is proposed to change the gear cone angle depending on the offset:

$$\gamma_{gear\text{-}hypoid} = \gamma_{gear\text{-}spiral}*\cos(\lambda) \tag{8}$$

or $$\gamma_{gear\text{-}hypoid} = \gamma_{gear\text{-}spiral}*\cos(\lambda^*) \tag{9}$$

where: $\gamma_{gear\text{-}hypoid}$=pitch angle of hypoid gear member

Establishing the gear blank dimensions is explained in a four step (A-D) process.

Figure 2:
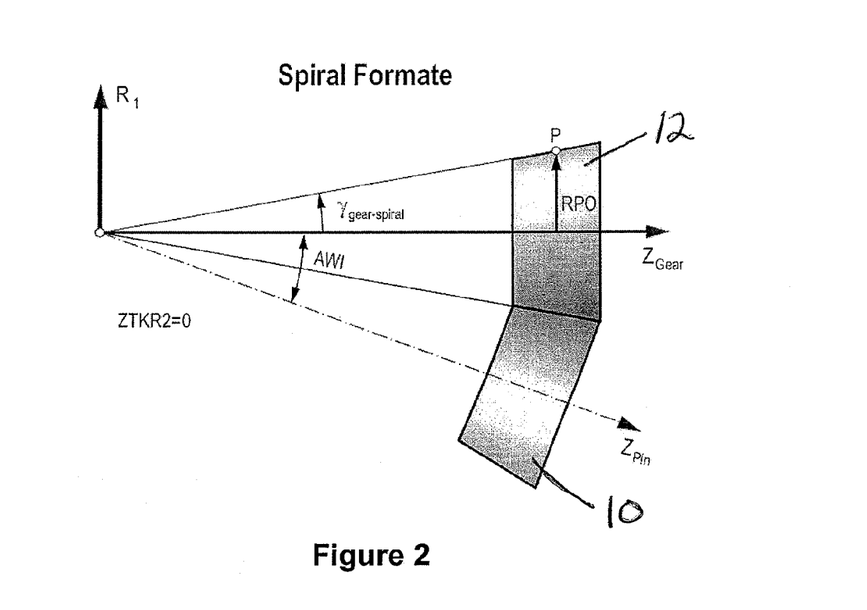
FIG. 2 is a side view of the gearset of FIG. 1 showing pitch angle, shaft angle and crossing point.

Step A—The spiral bevel gear version has a pitch angle of $\gamma_{gear\text{-}spiral}$ and a distance crossing point to pitch cone (ZTKR2) of zero (FIG. 2). $R_1$ is the radial coordinate direction of the gear coordinate system, $Z_{Gear}$ is the axis of rotation of the gear and $Z_{pin}$ is the axis of rotation of the pinion. AWI is the shaft angle between pinion and gear.

Figure 3:
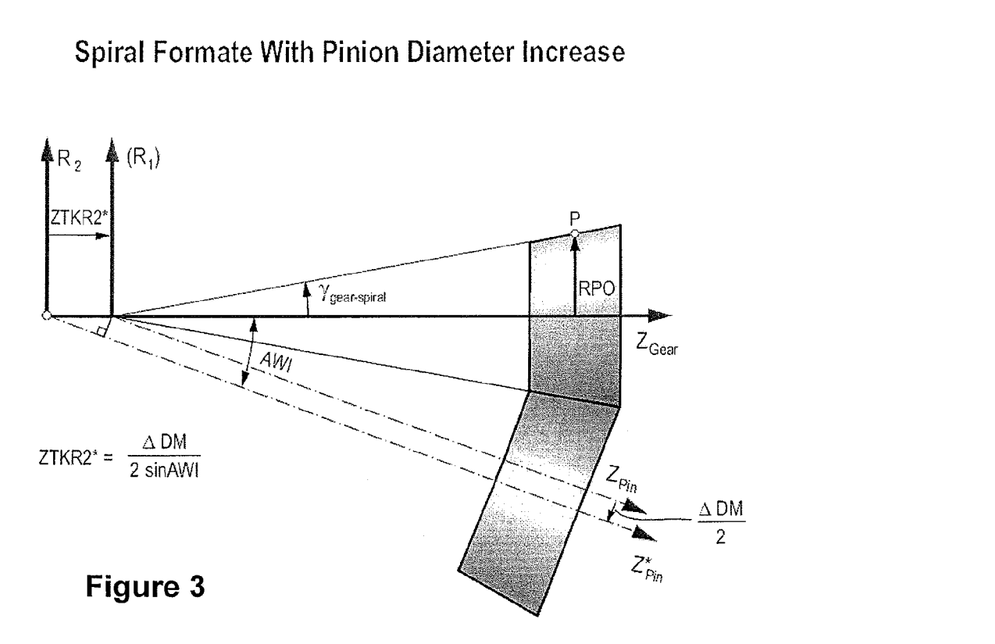
FIG. 3 illustrates a new crossing point $R_2$ due to the enlarged pinion diameter resulting from a movement in the Step 1 direction of FIG. 1.

Step B—In case of a pinion diameter increase, ΔDM, the crossing point moves in negative $Z_{Gear}$ axis direction and establishes a new coordinate system origin with $R_2$ (FIG. 3):

$$ZTKR2^* = \frac{\Delta DM}{2\sin(AWI)} \tag{10}$$

where: ZTKR2*=crossing point to pitch apex

Figure 4:
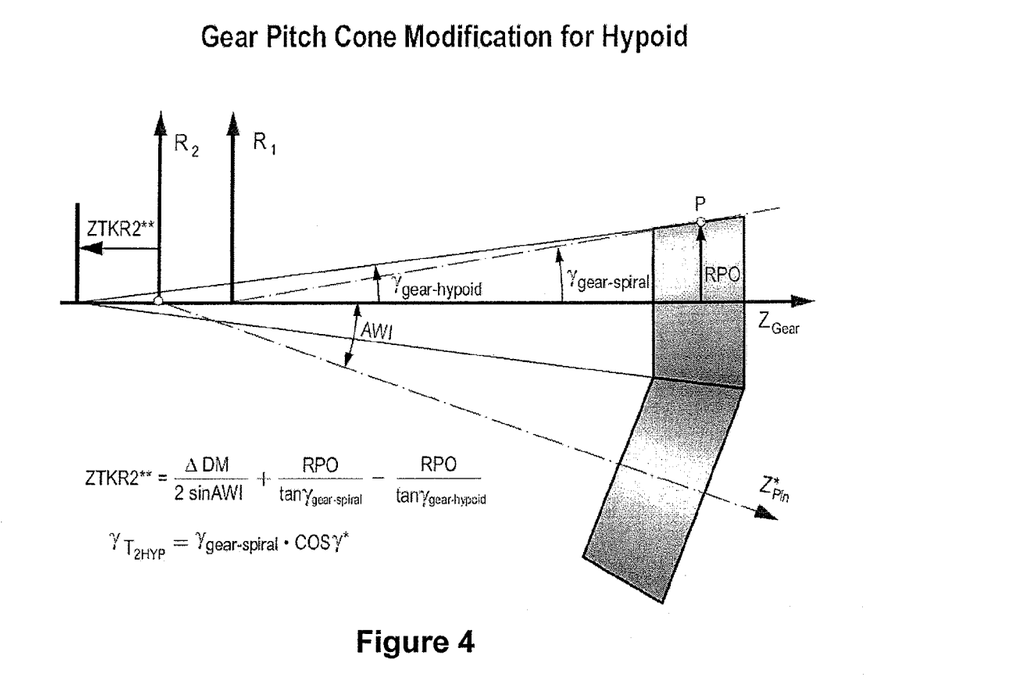
FIG. 4 illustrates a shift in the location of the pitch apex due to a changed pitch angle of the gear resulting from a movement in the Step 1 direction of FIG. 1.

Step C—The changed pitch angle of the gear for a hypoid pair shifts the location of the pitch apex (while the pitch point P at the center of the face width and the coordinate origin $R_2$-$Z_{Gear}$ remain unchanged) as shown in FIG. 4:

$$ZTKR2^{**} = \Delta DM/(2\sin(AWI)) + RPO/\tan\gamma_{gear\text{-}spiral} - RPO/\tan\gamma_{gear\text{-}hypoid} \tag{11}$$

where: RPO=gear pitch radius

Figure 5:
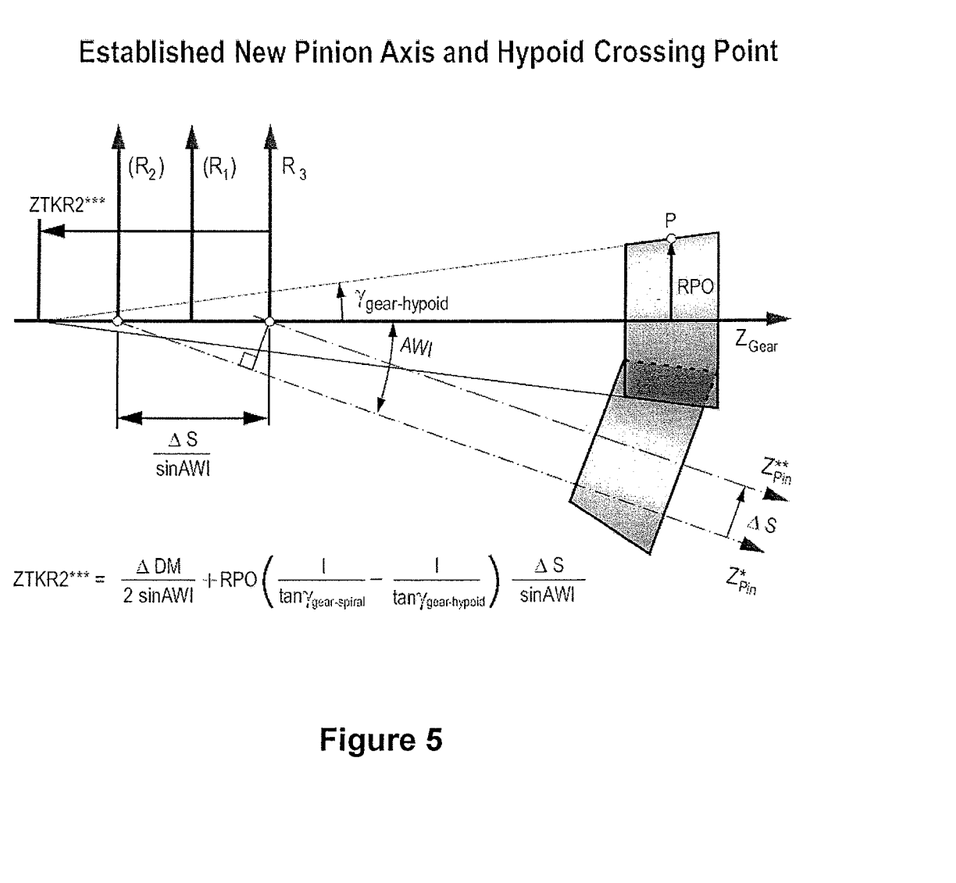
FIG. 5 shows a new crossing point $R_3$ as a result of the movement of the pinion axis (Step 2) in FIG. 1.

Step D—The horizontal movement (FIG. 1) of ΔS (or ΔS*) will move the pinion axis in case of positive ΔS values towards the gear axis and move the crossing point in positive Z-axis direction by ΔS/sin(AWI), which will establish the new location of the crossing point $R_3$-$Z_{Gear}$ and the final distance, ZTKR2*, crossing point to pitch apex (FIG. 5**):

$$ZTKR2^{***} = \Delta DM/(2\sin(AWI)) + RPO/\tan\gamma_{gear\text{-}spiral} - RPO/\tan\gamma_{gear\text{-}hypoid} - \Delta S/\sin(AWI) \tag{12}$$

Figure 6:
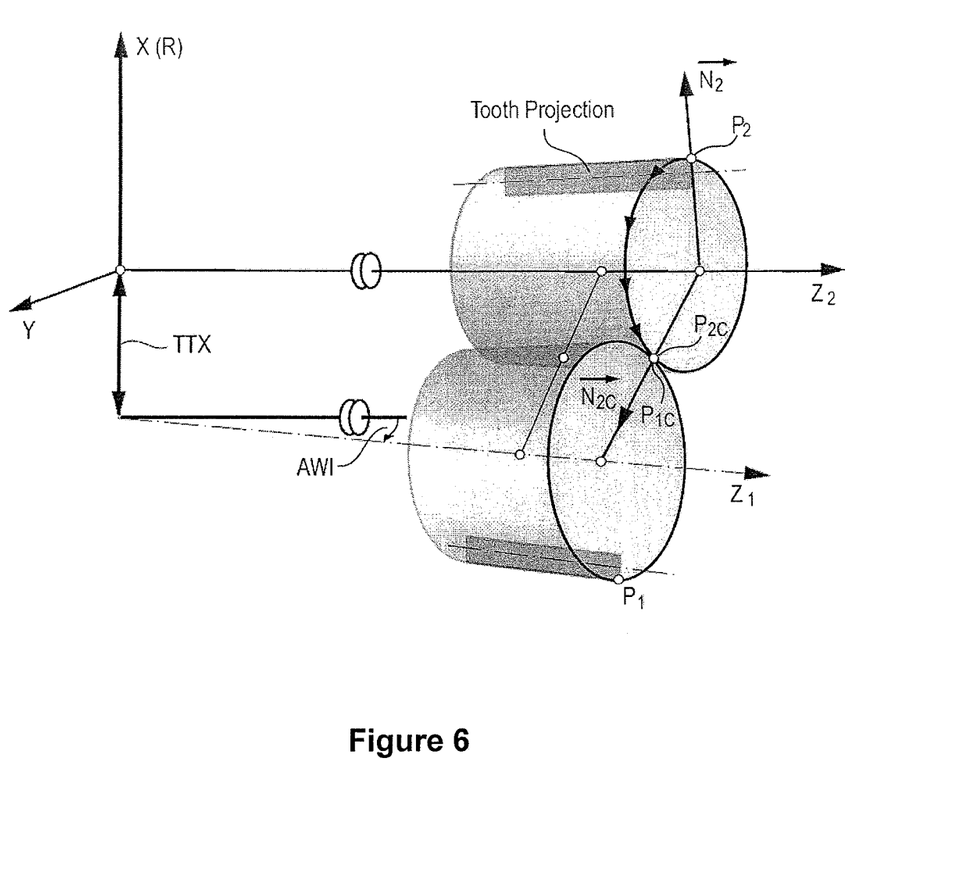
FIG. 6 is a three dimensional representation of the offset gear pair members.

The pinion cone angle is calculated using the known three dimensional point generating principle between two axes in a general three dimensional arrangement in space (FIG. 6).

In order to achieve correct pressure angles between pinion and gear flanks, flank points or surface elements are preferably generated in surface lines while they are passing through the generating plane (or more correct the generating surface). The trapezoidal profile of the gear teeth is oriented around the gear root cone (not bend around). The gear tooth profile, not the slot profile, has to be used to define the blade pressure angles for the pinion cutting in order for the blades and the basic setting arrangement to duplicate the non-generated gear while generating the pinion slots.

Figure 7:
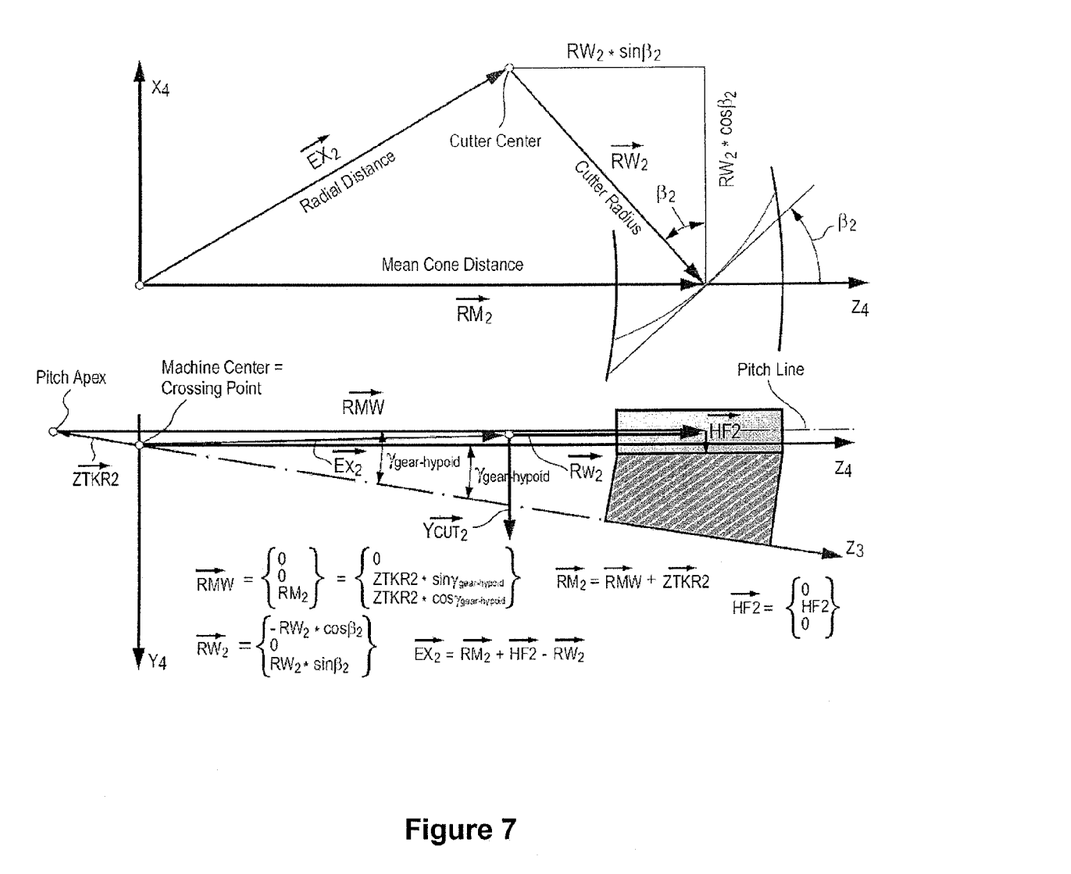
FIG. 7 illustrates a basic machine setup for defining the manufacturing machine setup and kinematics of the non-generated gear member of the gear set.

A basic machine setup is the preferred method used to define the manufacturing machine setup and kinematics. This will also indirectly define the flank surfaces as well as the tooth root geometry of both members. FIG. 7 shows the non-generated gear with its axis Z3 in the horizontal basic machine plane Y4-Z4. The crossing point on the gear axis is located in the machine center (origin of the coordinate system Y4-Z4). The axis Y4 is the cradle axis. The gear is positioned with the angle $\gamma_{gear\text{-}hypoid}$ such that the pitch line, as well as the root line, is parallel to the axis Z4. The cutter radius vector is adjusted to achieve the desired spiral angle at the center face width (mean cone distance). All relevant formulas for a non-generated gear basic machine setup can be derived from the graphical representation in FIG. 7.

Figure 8:
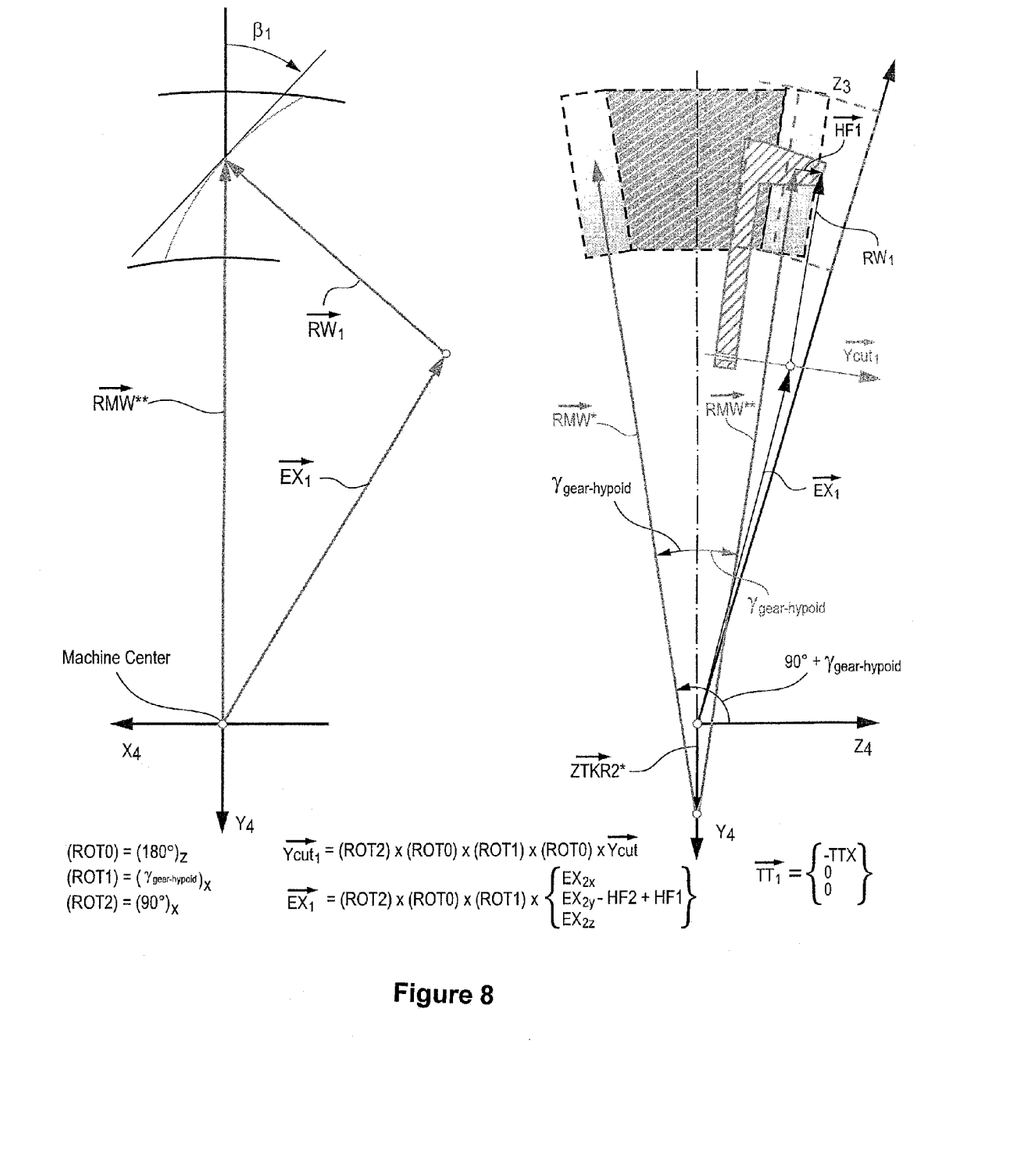
FIG. 8 illustrates a basic machine setup for defining the manufacturing machine setup and kinematics of the generated pinion member of the gear set.

In order to establish the generated pinion basic machine setup, the triangular vector $RM_2$, $RW_2$ and $EX_2$ (FIG. 7) has to be rotated by $\gamma_{gear\text{-}hypoid}$ about the X4-axis. Then the three vectors are rotated by 180° about the Y4-axis and in a third rotation about the X4-axis by 90° in order to line up the pinion axis with the Y4-axis (as shown in FIG. 8). The cutter axis vector $Y_{cut2}$ has to also perform all of those rotations and then be reversed in its direction to define the correct cutter or grinding wheel orientation ($Y_{cut1}$).

Once basic machine settings are established for the gear and/or pinion, transformation of the basic machine settings movements to a system of linear, rotational and pivoting axes of a universal yet simplified machine are carried out. Such universal machines are discussed above, for example, in the previously referenced U.S. Pat. Nos. 4,981,402; 6,669,415 and 6,712,566.

The tool definitions such as point radius, blade angle of inside and outside cutting blades for pinion and gear, are calculated using the common rules for bevel and hypoid gear sets manufactured in a completing process. After first defining the pressure angles of the gear tool, the pinion tool pressure angles have to be calculated differently than what is known in bevel and hypoid gears (derived from a flat generating gear) as discussed in the following paragraph.

Figure 9:
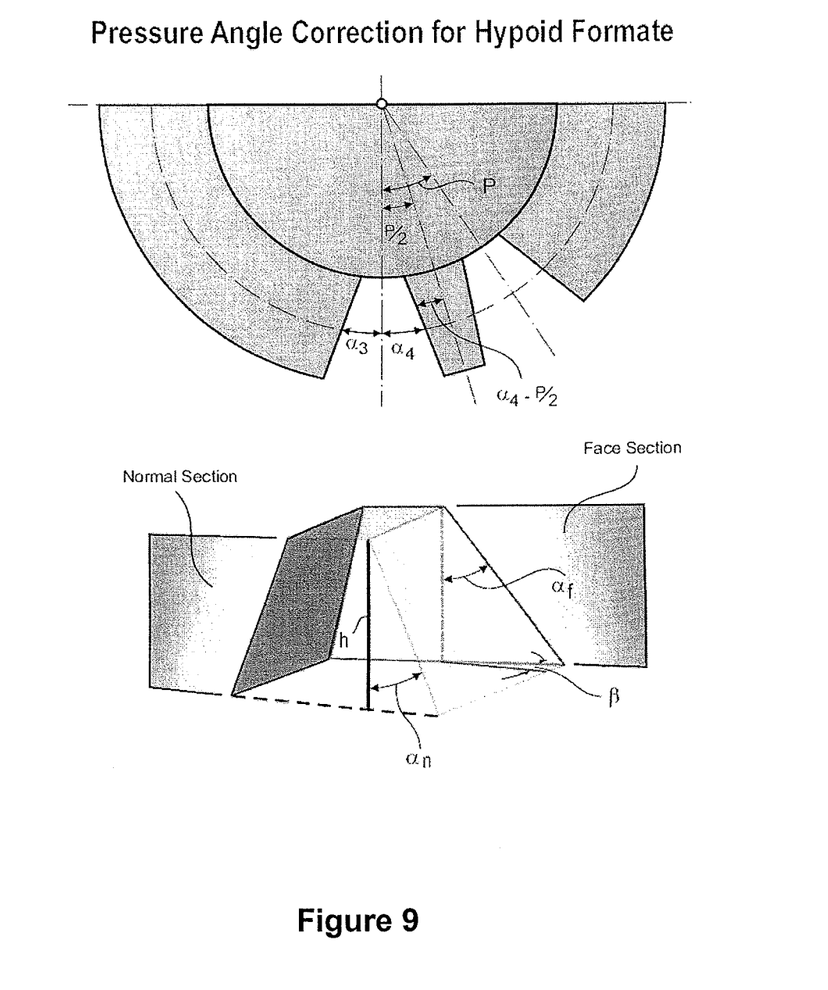
FIG. 9 shows an adjustment of the cutting blade pressure angle for the pinion member to eliminate undesirable mismatch between pinion and gear teeth.

The inventive method presents a new solution to eliminate undesirable mismatch between pinion and gear teeth (cut with identical corresponding blade angles). The effect of trapezoidal slots, wound around a cylinder or a slim cone, requires a correction or adjustment of the pinion blade pressure angle (FIG. 9) of:

$$\Delta\alpha = -360°/(2*Z_2) \quad (13)$$

where: $\Delta\alpha$=change in pinion pressure angle due to non-generated gear member
$Z_2$=number of gear teeth.

In case of teeth which are oriented under a spiral angle to an axial plane, in addition to the curved shape in longitudinal direction, the angle $\Delta\alpha$ is calculated as:

$$\Delta\alpha_F = -360°/(2*Z_2) \quad (14)$$

$$\Delta\alpha_N = \arctan\{\tan[\arctan(\tan \alpha_N/\cos \beta 3 - 360°/2*Z_2] *\cos \beta\} \quad (15)$$

where: $\Delta\alpha_F$=change in pressure angle in face section
$\Delta\alpha_N$=change in pressure angle in normal section
$\beta$=spiral angle at center face width of gear.

The choice of completing tools will generate a certain amount of length crowning between the mating pinion and gear flanks. This length crowning might be reduced or increased by a cutter tilt and subsequent blade angle adjustment (as known in the art). Other elements of crowning such as profile crowning, flank twist or in general term first, second and higher order flank modifications can be applied to the inventive gearset in order to optimize its physical properties. For those modifications, the techniques known in the art for bevel and hypoid gears (e.g. U.S. Pat. No. 5,580,298) are well suited.

Although the present invention has been discussed with reference to a non-generated gear member with straight or curved tooth profile as a generating gear, the invention is not limited thereto. A flat or essentially flat theoretical generating gear may also be utilized as the basis for deriving both gear and pinion members which are both formed by generating. Additionally, while the preferred embodiment of the invention has been described in terms of vector relationships, other mathematical methods may be utilized such as, for example, trigonometric expressions or matrix transformations.

Furthermore, it should be noted that while the invention has been discussed above with reference to bevel gear pairs having low shaft angles in the range of greater than 0° to 30°, preferably greater than 0° to 20°, and having hypoid offsets in the range of zero to the sum of half the mean pitch diameters of the two members of the bevel gear pair, it is especially noted with respect to bevel gear pairs having zero hypoid offset that such bevel gear pairs most preferably also comprise each of the first gear pair member and the second gear pair having parallel tooth depth and at least one of the first gear pair member and the second gear pair member being a generated member.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method for providing a bevel gear pair having a first bevel gear member and a second bevel gear member, said bevel gear pair further comprising:
   a shaft angle (AWI) between said first and second members being in the range of greater than zero degrees to 30 degrees, and
   a hypoid offset (TTX) between said first and second members being in the range of greater than zero to the sum of half the mean pitch diameters of said first and second members,
   wherein said method comprises the steps of:
   providing for the first member a pitch angle ($Y_{gear\text{-}hypoid}$) which is changed, in dependency of the hypoid offset (TTX), with respect to that of a reference bevel gear pair (10, 12) with the same shaft angle (AWI) and the same mean pitch diameter of the provided second member but with no offset,
   wherein the crossing point ($R_3$-$Z_{gear}$) of the axis ($Z_{gear}$) of the provided second member and the axis ($Z_{pin}$) of the provided first member is set at a distance (ZTKR2*) from the pitch apex of the provided second member, said distance (ZTKR2*) being based on said changed pitch angle ($Y_{gear\text{-}hypoid}$) and on a displacement ($\Delta S$; $\Delta S^*$) of the axis of the first member, said displacement ($\Delta S$; $\Delta S^*$) being orthogonal to the offset direction and re-establishing the center distance of the reference bevel gear pair.

2. The method of claim 1 wherein said shaft angle is in the range of greater than zero degrees to 20 degrees.

3. The method of claim 1 wherein said first member and second member have the same number of teeth.

4. The bevel gear pair of claim 1 wherein at least one of said first member and second member is a generated member.

5. The method of claim 1 wherein at least one of said first member and second member comprises a tooth profile shape in the form of an involute.

6. The method of claim 1 wherein said first member and second member each have parallel tooth depth.

7. The bevel gear pair of claim 1 wherein said first member is a pinion member and the second member is a gear member, said pinion member having a greater number of teeth than said gear member.

\* \* \* \* \*